United States Patent [19]

Arashiro et al.

[11] Patent Number: 5,424,359
[45] Date of Patent: Jun. 13, 1995

[54] THERMOPLASTIC RESIN COMPOSITION AND PROCESS FOR PREPARING MODIFIED POLYOLEFIN TYPE RESIN

[75] Inventors: Yusuke Arashiro; Yoshio Katoh; Keiko Matsuhisa; Mitsutoshi Aritomi, all of Mie, Japan

[73] Assignee: Mitsubishi Petrochemical Co., Ltd., Tokyo, Japan

[21] Appl. No.: 201,008

[22] Filed: Feb. 24, 1994

[30] Foreign Application Priority Data

Feb. 26, 1993 [JP] Japan .................... 5-038311
Mar. 4, 1993 [JP] Japan .................... 5-043896
Apr. 5, 1993 [JP] Japan .................... 5-077837

[51] Int. Cl.$^6$ .................... C08L 51/06; C08L 67/02
[52] U.S. Cl. .................... 525/64; 525/68
[58] Field of Search .................... 525/64, 68

[56] References Cited

U.S. PATENT DOCUMENTS 4,172,859 10/1979 Epstein .................... 525/109
4,666,972 5/1987 Kohler .................... 525/64

Primary Examiner—Patricia A. Short
Attorney, Agent, or Firm—Oblon, Spivak, McClelland, Maier, & Neustadt

[57] ABSTRACT

Disclosed is a thermoplastic resin composition comprising (A) 90 to 10% by weight of a modified polyolefin type resin obtained by subjecting 100 parts by weight of a polyolefin type resin to graft polymerization with 0.01 to 20 parts by weight of an $\alpha,\beta$-unsaturated carboxylate having a hydroxyl group and 0.01 to 50 parts by weight of an aromatic vinyl compound; and (B) 10 to 90% by weight of a saturated polyester.

12 Claims, No Drawings

THERMOPLASTIC RESIN COMPOSITION AND PROCESS FOR PREPARING MODIFIED POLYOLEFIN TYPE RESIN

BACKGROUND OF THE INVENTION

This invention relates to a thermoplastic resin composition in which compatibility of a polyolefin type resin and a saturated polyester is improved, a balance between heat resistance and mechanical strength is excellent and also molding processability, water absorption resistance and appearance of a molded product are excellent, and a process for preparing a modified polyolefin type resin having excellent adhesiveness, coatability, printability and polymer-modifying property, by subjecting a polyolefin type resin to graft polymerization with a monomer having a polar functional group.

A polyolefin type resin represented by a polypropylene resin and a polyethylene resin has low specific gravity, a low price and also excellent mechanical strength, luster, transparency, moldability, water absorption resistance and chemical resistance so that it has been widely used alone or as one component of a polymer blend for preparing various molded products. However, the polyolefin type resin has a non-polar molecular structure so that its affinity for other substance is poor, whereby various characteristics such as adhesiveness, coatability, printability, antistatic property and compatibility in a polymer blend are extremely poor. Also, heat resistance of the polyolefin type resin is not so high, and such a drawback is an obstacle to its use as an engineering plastics.

On the other hand, a saturated polyester represented by polybutylene terephthalate and polyethylene terephthalate has been recognized as an engineering plastics having excellent heat resistance, chemical resistance and electrical characteristics. However, the saturated polyester has a drawback that water absorption resistance is poor so that water is easily absorbed into the saturated polyester during molding processing such as injection molding and extrusion molding and especially under conditions of high temperature and high humidity, whereby physical properties such as impact resistance are lowered.

As one of attempts to cope with the case where desired various properties cannot be satisfied sufficiently by one resin material, there has been frequently used a technique of compensating insufficient properties by mixing it with other resin material. If a composition having both good properties of the saturated polyester and the polyolefin type resin and compensating undesirable properties each other can be obtained by such a technique, an excellent resin material having a wide application field can be provided.

However, the saturated polyester and the polyolefin type resin do not have compatibility with and affinity for each other so that when the both components are simply mixed, adhesiveness at the interface of this two phase structure is not good. Therefore, the interface of a molded product obtained becomes a defective portion to lower mechanical strength. Also, these two phases can hardly take uniform and fine dispersion forms so that when shear stress is applied during molding processing such as injection molding, laminar peeling (delamination) is easily caused.

In order to solve the above problems, it has been proposed to blend into a saturated polyester, a modified polyolefin type resin obtained by introducing functional groups which react with the saturated polyester into a polyolefin type resin having poor reactivity.

For example, a resin composition comprising an unsaturated carboxylic acid-modified polypropylene resin and a saturated polyester has been disclosed in Japanese Provisional Patent Publication No. 74168/1981. However, the unsaturated carboxylic acid-modified polypropylene resin and the saturated polyester have insufficient dispersibilities so that laminar peeling is easily caused, whereby a satisfactory resin composition for practical use cannot be obtained. Further, resin compositions each comprising an epoxy-modified polyolefin type resin and a saturated polyester have been disclosed in Japanese Provisional Patent Publications No. 60746/1986 and No. 213352/1989. When these compositions are used, compatibility can be improved to some extent, but the compositions are partly gelled during melting and kneading by an extruder or the like to lower fluidity, whereby there are problems that extruded strand cannot be drawn stably and surface appearance of an extrusion molded product is worsened.

Further, the present inventors have studied a composition comprising a polyolefin type resin modified with a hydroxyl group-containing $\alpha,\beta$-unsaturated carboxylate, and a saturated polyester resin (Japanese Patent Application No. 235862/1992), but the addition amount of hydroxyl groups is not sufficient so that further improvement is required.

In order to remove above drawbacks, there have been attempted a number of methods for preparing modified resins by subjecting a polyolefin type resin to graft polymerization with a polymerizable monomer having a polar functional group. For example, a method of modifying a polyolefin type resin by using a methacrylate or acrylate having a hydroxyl group for the purpose of improving adhesiveness or coatability has been disclosed in Japanese Provisional Patent Publication No. 160449/1979, but the addition amount of hydroxyl groups is not sufficient for practical use particularly as a compatibilizer. There has been known a method of using a radical polymerization initiator having high hydrogen-abstracting ability in order to increase the graft polymerization amount of a monomer having a hydroxyl group to a main polymer chain. In this method, molecular chain cleavage of the main polymer chain is also increased to cause problems such as lowering of physical properties.

As a method of preventing molecular chain cleavage of a main polymer chain, there has been generally used a method of preventing deterioration caused by heat or oxygen in a reaction system. As a specific example thereof, there may be mentioned a method of carrying out a reaction under inert gas or under reduced pressure, but it cannot be said that this method has a sufficient effect.

That is, there has not yet been proposed a means which can simultaneously achieve two tasks of increasing the graft polymerization amount of a monomer having a hydroxyl group and preventing molecular chain cleavage.

Further, as a result of precisely analyzing a modified polyolefin resin obtained by subjecting a polyolefin type resin to graft polymerization with a methacrylate type monomer having a hydroxyl group (e.g. 2-hydroxyethyl methacrylate) by a melting reaction, it has been found that there is a problem that a number of ester portions to which a hydroxyl group is bonded are lost by hydrolysis or the like. That is, a task of increasing a hydroxyl group-remaining percentage is also one of the important tasks of this kind of modifying method, and a means for achieving the task has been demanded.

SUMMARY OF THE INVENTION

An object of the present invention is to provide a thermoplastic resin composition in which compatibility of a polyolefin type resin and a saturated polyester is improved to obtain a stable dispersion structure which cannot be achieved by conventional techniques and also mechanical strength and appearance of a molded product are excellent. Another object of the present invention is to provide a process for preparing a novel modified polyolefin type resin used for the above composition, in which a graft polymerization addition amount is increased and molecular chain cleavage is reduced by modifying a polyolefin type resin by melting.

The present inventors have studied intensively in order to achieve the above tasks and consequently found that a composition comprising a specific hydroxyl group-modified polyolefin type resin and a saturated polyester exhibits extremely good affinity; and a specific hydroxyl group-modified polyolefin type resin can be obtained by melting and kneading a polyolefin type resin with an $\alpha,\beta$-unsaturated carboxylate having a hydroxyl group and an aromatic vinyl compound, to accomplish the present invention.

The present invention is a thermoplastic resin composition which comprises Components (A) and (B) shown below:

(A) 90 to 10% by weight of a modified polyolefin type resin obtained by subjecting 100 parts by weight of a polyolefin type resin to graft polymerization with 0.01 to 20 parts by weight of an $\alpha,\beta$-unsaturated carboxylate having a hydroxyl group(s) and 0.01 to 50 parts by weight of an aromatic vinyl compound; and (B) 10 to 90% by weight of a saturated polyester.

A specific hydroxyl group-modified polyolefin type resin and a saturated polyester to be used in the present invention exhibit good affinity because a hydroxyl group of Component (A) and a carboxyl group or ester group of Component (B) are reacted to generate a graft copolymer which is a compatibilizer of a polyolefin type resin and a saturated polyester.

DESCRIPTION OF THE PREFERRED EMBODIMENTS

In the following, the present invention is explained in detail.

<Modified polyolefin type resin (A)>

The modified polyolefin type resin (A) to be used in the present invention is obtained by subjecting a polyolefin type resin to graft polymerization with an $\alpha,\beta$-unsaturated carboxylate having a hydroxyl group(s) and an aromatic vinyl compound in the presence or absence of a radical polymerization initiator so as to introduce the $\alpha,\beta$-unsaturated carboxylate having a hydroxyl group(s) and the aromatic vinyl compound into the polyolefin type resin.

As the $\alpha,\beta$-unsaturated carboxylate having a hydroxyl group(s), there may be mentioned, for example, 2-hydroxyethyl methacrylate, 2-hydroxyethyl acrylate, 2-hydroxypropyl acrylate, 2-hydroxypropyl methacrylate, 2,3-dihydroxypropyl methacrylate, 2,3-dihydroxypropyl acrylate, 2-hydroxymethyl-3-hydroxypropyl methacrylate, 2-hydroxymethyl-3-hydroxypropyl acrylate, 2,2-bis(hydroxymethyl)-3-hydroxypropyl methacrylate, 2,2-bis (hydroxymethyl)-3-hydroxypropyl acrylate and a methacrylate or acrylate of an oligomer of ethylene glycol or propylene glycol having 4 to 40 carbon atoms; and bis(2-hydroxyethyl)maleate, bis(2-hydroxyethyl)fumarate, bis(2-hydroxypropyl)maleate, bis(2-hydroxypropyl)fumarate, bis(2,3-dihydroxypropyl)maleate, bis(2,3dihydroxypropyl) fumarate, bis(2-hydroxymethyl-3-hydroxypropyl)maleate, bis(2-hydroxymethyl-3-hydroxypropyl)fumarate, bis(2,2-bishydroxymethyl-3-hydroxypropyl)maleate, bis(2,2-bishydroxymethyl-3-hydroxypropyl)fumarate and a maleate or fumarate of an oligomer of ethylene glycol or propylene glycol having 4 to 40 carbon atoms. In addition to the above maleate or fumarate in which two carboxylic acids are esters of hydroxyalkyl groups, a maleate or fumarate in which one carboxylic acid is an ester of a hydroxyalkyl group may be mentioned as a similar monomer.

The $\alpha,\beta$-unsaturated carboxylates described above may be used singly or in combination of two or more. Among them, 2-hydroxyethyl methacrylate, 2-hydroxyethyl acrylate, 2-hydroxypropyl acrylate, 2-hydroxypropyl methacrylate and a methacrylate or acrylate of an oligomer of ethylene glycol or propylene glycol having 4 to 40 carbon atoms are preferred, and 2-hydroxyethyl methacrylate is particularly preferred.

As the aromatic vinyl compound, there may be mentioned, for example, styrene, $\alpha$-methylstyrene, t-butylstyrene, $\alpha$-methylvinyltoluene, $\alpha$-methoxystyrene, nitrostyrene, cyanostyrene, hydroxymethylstyrene, methylstyrene, dimethylstyrene, 2,4,6-trimethylstyrene, chlorostyrene, dichlorostyrene, bromostyrene, dibromostyrene, vinylnaphthalene, vinylpyridine and vinylimidazole. Among them, styrene, $\alpha$-methylstyrene, t-butylstyrene, $\alpha$-methylvinyltoluene, methylstyrene, dimethylstyrene, chlorostyrene, dichlorostyrene, bromostyrene, dibromostyrene and vinylnaphthalene are preferred. Among them, styrene, $\alpha$-methylstyrene and methylstyrene are particularly preferred. These compounds may be used singly or in combination of two or more.

In the thermoplastic resin composition of the present invention, it is particularly preferred that the $\alpha,\beta$-unsaturated carboxylate having a hydroxyl group is 2-hydroxyethyl methacrylate, and the aromatic vinyl compound is styrene, $\alpha$-methylstyrene or methylstyrene.

The polyolefin type resin to be used as a starting material of Component (A) is a polymer comprising at least one $\alpha$-olefin preferably having 2 to 12, more preferably 2 to 10, most preferably 2 to 8 carbon atoms preferably having a crystallinity at room temperature measured by X-ray diffraction of 10% or more, more preferably 20% or more and having a melting point of 40° C. or higher. When the crystallinity is lowered, the elastic modulus of a final composition is lowered. The polyolefin type resin is required to have a sufficient molecular weight at normal temperature as a resin for molding. For example, when the polyolefin type resin contains propylene as a main component, said resin preferably has a molecular weight corresponding to a melt flow rate (MFR) measured according to JIS K 6758 of 0.01 to 500 g/10 min, more preferably 0.05 to 100 g/10 min.

As an example of the above $\alpha$-olefin which is a constituent of the polyolefin type resin, there may be mentioned ethylene, propylene, butene-1, pentene-1, hexene-1, 3-methylbutene-1, 4-methylpentene-1, 3,3-dimethylpentene-1, 3-methylhexene-1, 4-methylhexene-1, 4,4-dimethylhexene-1, 5-methylhexene-1, allylcyclopentane, allylcyclohexane, allylbenzene, 3-cyclohexylbutene-1, vinylcyclopropane, vinylcyclohexane, 2-vinylbicyclo[2.2.1]heptane, heptene-1 and octene-1. One or more of these α-olefins may be used as a polymerization component.

Among them, ethylene, propylene, butene-1, pentene-1, hexene-1, 3-methylbutene-1, 3-methylpentene-1, 4-methylpentene-1 and 3-methylhexene-1 are preferred, and ethylene, propylene, butene-1, 3-methylbutene-1 and 4-methylpentene-1 are particularly preferred. When the α-olefin is hexene-1, at least one of them is preferably used in combination.

As other component which may be used as a part of the polymerization component, there may be mentioned a conjugated diene such as butadiene; and a non-conjugated diene such as 4-methyl-1, 4-hexadiene, 5-methyl-1, 4-hexadiene, 7-methyl-1, 6-octadiene and 1,9-decadiene.

The method of introducing the above α,β-unsaturated carboxylate having a hydroxyl group and aromatic vinyl compound into the polyolefin type resin is not particularly limited, and may include, for example, a method in which the polyolefin type resin, the α,β-unsaturated carboxylate having a hydroxyl group(s) and the aromatic vinyl compound are allowed to coexist and reacted in the presence or absence of a radical polymerization initiator such as an organic peroxide, a method of irradiating UV rays or radiation and a method of contacting with oxygen or ozone.

The radical polymerization initiator is used in an amount of 0 to 30 parts by weight, preferably 0 to 10 parts by weight based on 100 parts by weight of the above polyolefin type resin.

The graft polymerization is generally carried out at a temperature of 30° to 350° C., preferably 50° to 300° C., for a modification time of 50 hours or shorter, preferably 1 minute to 24 hours. The graft polymerization may be carried out in either of a solution state, a melted state and a suspended state. During melting modification by an extruder or the like, for the purpose of increasing a reaction efficiency, an organic solvent such as xylene may be added. In order to prevent main chain cleavage of the polyolefin type resin and lowering of a graft polymerization efficiency which are caused by oxygen in this reaction system, it is effective to carry out kneading under reduced pressure. Further, a modified polyolefin type resin with high purity can be obtained by removing unreacted components by kneading under reduced pressure.

In the present invention, the following method is particularly preferred.

A process for preparing a modified polyolefin type resin, which comprises melting and kneading 100 parts by weight of the polyolefin type resin with 0.01 to 20 parts by weight of the α,β-unsaturated carboxylate having a hydroxyl group(s) and 0.01 to 50 parts by weight of the aromatic vinyl compound under reduced pressure in the presence of a radical polymerization initiator.

The amount of the α,β-unsaturated carboxylate having a hydroxyl group to be added is 0.01 to 20 parts by weight, preferably 0.05 to 10 parts by weight based on 100 parts by weight of the polyolefin type resin. The amount of the aromatic vinyl compound which is used in combination with the α,β-unsaturated carboxylate having a hydroxyl group(s), to be added is 0.01 to 50 parts by weight, preferably 0.05 to 20 parts by weight based on 100 parts by weight of the polyolefin type resin.

The weight ratio of the amount of the α,β-unsaturated carboxylate having a hydroxyl group to be added to that of the aromatic vinyl compound may be 1:99 to 99:1, preferably 10:90 to 90:10. If the aromatic vinyl compound is not added or its ratio is too low, the hydroxyl group-remaining percentage of the α,β-unsaturated carboxylate having a hydroxyl group(s) with which the polyolefin type resin is subjected to graft polymerization is lowered, whereby a sufficient amount of hydroxyl groups for modifying the polyolefin type resin cannot be introduced.

As the radical polymerization initiator which is necessary for subjecting the polyolefin type resin to graft polymerization with the modifier as described above, there may be used an organic or inorganic peroxide such as t-butyl hydroperoxide, cumene hydroperoxide, 2,5-dimethylhexane-2,5-dihydroperoxide, t-butyl peroxybenzoate, benzoyl peroxide, dicumyl peroxide, 1,3-bis(t-butyl peroxyisopropyl)benzene, dibutyl peroxide, methyl ethyl ketone peroxide, potassium peroxide and hydrogen peroxide; an azo compound such as 2,2'-azobisisobutyronitrile, 2,2'-azobis(isobutylamide) dihalide, 2,2 '-azobis [2-methyl-N-(2-hydroxyethyl)propionamide] and azodi-t-butane; and a carbon radical polymerization initiator such as dicumyl. These radical polymerization initiators may be suitably selected depending on the above modifier and a reaction system and may be used in combination of two or more. Further, the radical polymerization initiator may be used by dissolving it in an organic solvent.

The amount of the radical polymerization initiator to be used is 0.01 to 30 parts by weight, preferably 0.05 to 10 parts by weight based on 100 parts by weight of the above polyolefin type resin.

As an apparatus to be used for melting and kneading, an extruder or stirrer in which pressure can be reduced may be used. As a specific example thereof, there may be mentioned a Laboplasto mill with a depressurizing device; a single axial or biaxial kneader; a horizontal biaxial stirrer; or a vertical stirrer such as a double helical ribbon stirrer. The melting and kneading temperature may be any temperature so long as it is a temperature at which the polyolefin type resin is melted, but it is preferably 300° C. or lower in order to prevent deterioration of the polyolefin type resin. The melting and kneading time is 0.1 to 10 minutes, preferably 0.5 to 5 minutes. The vent pressure during melting and kneading is preferably 300 mmHg or lower, more preferably 200 mmHg or lower.

As a method of adding the modifier and the radical polymerization initiator, there may be used a method in which the modifier and the radical polymerization initiator are dry blended with the polyolefin type resin and the resulting blend is kneaded, a method in which either one of the modifier and the radical polymerization initiator is dry blended with the polyolefin type resin and while the resulting blend is kneaded, the other is added thereto, and a method in which the modifier and the radical polymerization initiator are added to the polyolefin type resin in a melted state.

For the purpose of increasing a reaction efficiency, a small amount of an organic solvent such as xylene may be added.

In the modified polyolefin type resin modified by the process described above, MFR measured according to JIS K 7210 is preferably 0.01 to 200 g/10 min, more preferably 0.01 to 100 g/10 min, further preferably 0.1 to 100 g/10 min, the content of the α,β-unsaturated carboxylate is 0.1 to 20% by weight, and the hydroxyl group-remaining percentage is to 30 to 100%, more preferably 40 to 100%.

The methods of measuring the content of the α,β-unsaturated carboxylate and the hydroxyl group-remaining percentage are described below.

The modified polyolefin type resin obtained by the process of the present invention has a number of polar functional groups so that it has an improved affinity for other polymers such as a polyamide, polyester and polycarbonate. Therefore, the modified polyolefin type resin can be used as a compatibilizer of a polyolefin and these other polymers.

A factor of lowering the hydroxyl group-remaining percentage is explained below. However, the following explanation is to further clarify the concept of the present invention, and the present invention is not limited thereby.

When the case of a modified resin obtained by subjecting polypropylene (PP) to graft polymerization with an α,β-unsaturated carboxylate having a hydroxyl group is taken, the following mechanisms concerning loss of a hydroxyl group may be considered.

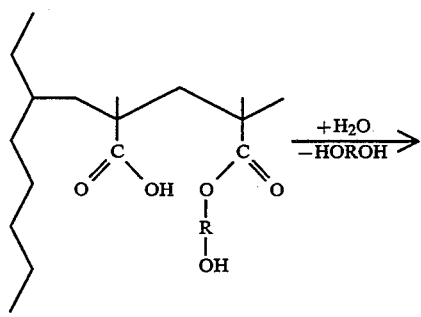

2) Cyclization

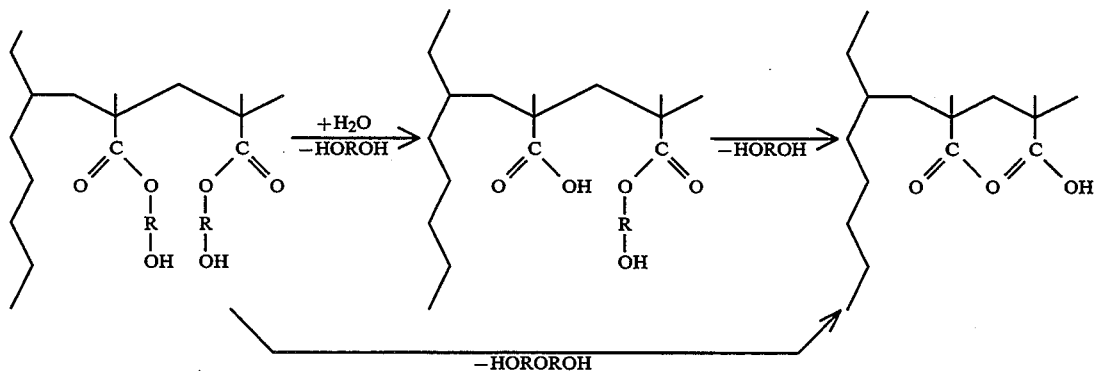

1) Chain hydrolysis

PP chain

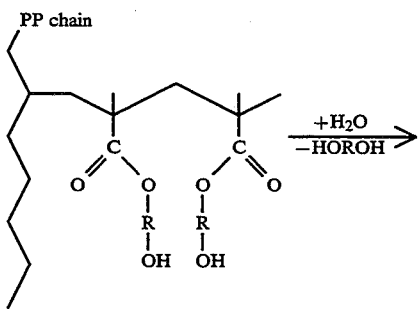

wherein R represents an alkylene group.

That is, the acrylate and/or methacrylate type monomers each having a hydroxyl group are adjacent to each other to cause interaction, whereby the ester portion to which a hydroxyl group is bonded is lost. Therefore, in the present invention, a copolymerizable monomer is interposed to prevent the above interaction, whereby the hydroxyl group-remaining percentage is increased.

<Saturated polyester (B)>

The saturated polyester (B) to be used in the present invention is a thermoplastic saturated polyester obtained by polycondensation of a dicarboxylic acid or a lower alkyl ester, acid halide or acid anhydride derivative of the dicarboxylic acid with a dihydroxy compound.

As a specific example of the dicarboxylic acid, there may be mentioned oxalic acid, malonic acid, succinic acid, glutaric acid, sebacic acid, terephthalic acid, isophthalic acid, p-carboxyphenoxyacetic acid, 2,6-naphthalenedicarboxylic acid and 2,7-naphthalenedicarboxylic acid.

As a specific example of the dihydroxy compound, there may be mentioned a straight alkylene glycol having 2 to 12 carbon atoms such as ethylene glycol, 1,3-propylene glycol, 1,4-butanediol and 1,6-hexandiol; an aromatic diol such as pyrocatechol, resorcinol and hydroquinone; an alicyclic glycol such as cyclohexanedimethanol; and alkyl-substituted derivatives of these compounds.

As a preferred example of the saturated polyester (B), there may be mentioned polyethylene terephthalate, polybutylene terephthalate, polyethylene naphthalate and poly(1,4-cyclohexanedimethylene terephthalate). Also preferred is a liquid crystal polyester, for example, a commercially available product with a trade name of X7G of Eastman Kodak Co., Vectra of Hoechst Celanese Co. or Ekonol of Sumitomo Kagaku Kogyo Co. These polyesters may be used singly or in combination of two or more.

<Compositional ratio of constitutional components>

The modified polyolefin type resin which is Component (A) and the saturated polyester which is Component (B) of the present invention may be compatible at any compositional ratio. In general, when the modified polyolefin type resin (A) is a main component, heat resistance of the polyolefin type resin is improved by mixing with the saturated polyester (B). On the other hand, when the saturated polyester (B) is a main component, water absorption resistance and molding processability are improved by mixing with Component (A). The compositional weight ratio of the polyolefin type resin (A) and the saturated polyester (B) at which both characteristics of these constitutional components can be obtained with a good balance is preferably 90 to 10:10 to 90, more preferably 70 to 30:30 to 70. If the ratio of Component (A) to Component (B) is less than 10% by weight, effects of improving moldability and water absorption resistance of the resulting composition are small as compared with a saturated polyester, while if it exceeds 90% by weight, an effect of improving heat resistance is small as compared with a polyolefin type resin.

<Additional components>

In the thermoplastic resin composition of the present invention, components other than Components (A) and (B) described above may be contained. For example, a part (up to 90% by weight) of the modified polyolefin type resin which is Component (A) may be replaced with an unmodified polyolefin type resin.

As additional components, there may be used 0.5 to 3% by weight of an antioxidant, a weather resistance improver, a nucleating agent, a flame retardant or a slipping agent; 3 to 15% by weight of a plasticizer, a fluidity improver or a releasing agent; and a transesterification catalyst such as tetrakis(2-ethylhexoxy)-titanium, dibutyltin oxide, p-toluenesulfonic acid, zinc acetate, copper acetate, calcium acetate, cesium acetate, triphenylphosphine, diphenyltin oxide and antimony trioxide. Further, it is effective for improving rigidity, heat resistance, dimensional precision or dimensional stability to add 5 to 40% by weight of an organic or inorganic filler or a reinforcing agent, particularly glass fiber, mica, talc, wallastonite, potassium titanate, calcium carbonate or silica to the thermoplastic resin composition. Also, 1 to 10% by Weight of various coloring agents or dispersants thereof may be used practically.

Further, it is effective for improving impact resistance of the thermoplastic resin composition to add a rubber component, particularly styrene-butadiene copolymer rubber and styrene-isoprene copolymer rubber or hydrides thereof; ethylene-propylene copolymer rubber and ethylene-propylenediene copolymer rubber, $\alpha,\beta$-unsaturated carboxylic acid anhydride-modified products thereof and unsaturated glycidyl ester- or unsaturated glycidyl ether-modified products thereof; and a copolymer comprising an unsaturated epoxy compound and ethylene, an unsaturated epoxy compound and a copolymer comprising ethylene and an ethylene type unsaturated compound. The formulation ratio of the above rubber component varies depending on the target physical properties, and it may be, for example, 5 to 30% by weight in 100% by weight of the thermoplastic resin composition in order to improve a balance between rigidity and impact resistance of the thermoplastic resin composition.

Further, a polyphenylene ether, hydroxyalkylated polyphenylene ether, nylon 6, nylon 6,6, nylon 6,10, nylon 6,12 or a polycarbonate may be contained in the thermoplastic resin composition in an amount of 1 to 70% by weight based on the total amount of the resin composition.

<Preparation and molding method of composition>

The method of obtaining the thermoplastic resin composition of the present invention is not particularly limited and may include a melting method, a solution method, a suspension method and a melting and kneading method. For practical use, a melting and kneading method is preferred. As the melting and kneading method, there may be suitably used a kneading method which is practically used for a thermoplastic resin. For example, the respective powdery or granular components and, if necessary, additives described in <Additional components> are uniformly mixed by a Henschel mixer, a ribbon blender or a twin-cylinder mixer, and then the mixture is kneaded by a single axial or plural axial kneading extruder, a roll mixer or a Banbury mixer.

In order to prevent deterioration of the modified polyolefin type resin by oxidation and hydrolysis of the saturated polyester, it is effective to carry out kneading under reduced pressure.

The respective components are melted and kneaded at a temperature of 100° C. to 400° C., preferably 120° C. to 300° C. Further, the kneading order and method of the respective components are not particularly limited. There may be used, for example, either of a method in which the modified polyolefin type resin (A), the saturated polyester (B) and the additional components are kneaded simultaneously; a method in which a part or all of the modified polyolefin type resin (A) and the saturated polyester (B) are kneaded and then kneaded with the remaining components; a method in which the polyolefin type resin, the $\alpha,\beta$-unsaturated carboxylate having a hydroxyl group(s), the aromatic vinyl compound and the radical polymerization initiator are kneaded to prepare the modified polyolefin type resin (A) and then the modified polyolefin type resin is kneaded with the remaining components; a method in which the polyolefin type resin and the $\alpha,\beta$-unsaturated carboxyl ate having a hydroxyl group(s), the aromatic vinyl compound, the radical polymerization initiator, the saturated polyester (B) and the additional components are kneaded simultaneously; and a method in which the respective components are kneaded under reduced pressure. Further, during melting and kneading, an organic solvent such as chlorobenzene, trichlorobenzene and xylene may be added.

A molding processing method of the thermoplastic resin composition of the present invention is not particularly limited, and there may be suitably used a molding method generally used for a thermoplastic resin, i.,e. various molding methods such as injection molding, blow molding, extrusion molding, thermal molding and press molding.

EXAMPLES

The present invention is described in detail by referring to Examples, but the present invention is not limited by these Examples.

In the following, "part" and "%" mean "part by weight" and "% by weight", respectively.

Reference Example 1

2,000 g of homopolymer powder of polypropylene (MFR at 230° C.: 1 g/10 min, melting point: about 164° C., referred to as "PP" in Table 1), 60 g of 2-hydroxyethyl methacrylate, 40 g of styrene and 20 g of t-butyl peroxybenzoate were mixed by a super mixer and then the mixture was kneaded under reduced pressure by using a TEX 30 Type biaxial extruder (trade name) manufactured by Nippon Seikosho Co. under conditions of a cylinder temperature of 180° C. and a screw rotary number of 250 rpm, a discharging amount of 5 kg/hr and a vent pressure of 50 mmHg to obtain a modified polyolefin type resin.

0.3 g of the modified polyolefin type resin obtained was dissolved in 20 ml of xylene by heating to 110° C. and then the solution was poured into 150 ml of methanol to effect precipitation. The precipitates were collected by filtration, washed with methanol and then dried under reduced pressure to obtain a purified modified polyolefin type resin. The 2-hydroxyethyl methacrylate content and the styrene content of the purified product was quantitated by the following methods. The results are shown in Table 1.

1) Quantitation of 2-hydroxyethyl methacrylate
Infrared spectroscopic analysis (IR method):

The purified modified polyolefin type resin was subjected to press molding to prepare a film, and IR spectrum of the film was measured. Quantitation was carried out by using a calibration curve prepared from absorption at 1,724 cm$^{-1}$ derived from carbonyl.

Proton nuclear magnetic resonance spectroscopic analysis (NMR method):

50 mg of the purified modified polyolefin type resin was dissolved in about 2 ml of o-dichlorobenzene by heating at 130° C. A sample was prepared by using deuterium benzene as a standard substance, and $^{1}$H-NMR spectrum of the sample was measured. Quantitation was carried out by using absorptions of methylene to which a hydroxyl group is bonded (chemical shift: 3.7 ppm) and methylene bonded thereto (chemical shift: 4.2 ppm).

By using the ratio of the contents obtained by these two measurement methods, a hydroxyl group-remaining percentage was determined according to the equation (I):

Hydroxyl group-remaining percentage (%)=

Hydroxyl group-remaining percentage (%) = (I)

$$\frac{\text{Content measured by } NMR \text{ method (\% by weight)}}{\text{Content measured by } IR \text{ method (\% by weight)}} \times 100$$

2) Quantitation of styrene
Infrared spectroscopic analysis (IR method):

The IR spectrum of the purified modified polyolefin type resin was measured in the same manner as described above, and quantitation was carried out by using a calibration curve prepared from absorption at 700 cm$^{-1}$ derived from an aromatic ring.

3) MFR

MFR of the modified polyolefin type resin was measured at 230° C. in the case of a modified polypropylene type resin and at 190° C. in the case of a modified polyethylene type resin according to JIS K 7210.

Reference Example 2

Procedures were carried out in the same manner as in Reference example 1 except for changing the amount of styrene from 40 g to 100 g. The results are shown in Table 1.

Reference Example 3

Procedures were carried out in the same manner as in Reference example 1 except for changing the amount of styrene from 40 g to 200 g. The results are shown in Table 1.

Reference Example 4

Procedures were carried out in the same manner as in Reference example 1 except for changing the amount of 2-hydroxyethyl methacrylate from 60 g to 100 g and the amount of styrene from 40 g to 100 g. The results are shown in Table 1.

Reference Example 5

Procedures were carried out in the same manner as in Reference example 1 except for changing the amount of 2-hydroxyethyl methacrylate from 60 g to 100 g. The results are shown in Table 1.

Reference Example 6

Procedures were carried out in the same manner as in Reference example 1 except for changing the amount of styrene from 40 g to 100 g and changing 20 g of t-butyl peroxybenzoate to 20 g of 1,3-bis(t-butyl peroxyisopropyl)benzene. The results are shown in Table 1.

Reference Example 7

Procedures were carried out in the same manner as in Reference example 1 except for changing the amount of 2-hydroxyethyl methacrylate from 60 g to 100 g and the amount of styrene from 40 g to 100 g and changing 20 g of t-butyl peroxybenzoate to 20 g of 1,3-bis(t-butyl peroxyisopropyl)benzene. The results are shown in Table 1.

Reference Example 8

Procedures were carried out in the same manner as in Reference example 4 except for carrying out kneading under normal pressure in place of kneading under reduced pressure. The results are shown in Table 1.

Reference Example 9

Procedures were carried out in the same manner as in Reference example 4 except for using a high density polyethylene Mitsubishi Polyethylene HY540 (trade name, produced by Mitsubishi Petrochemical Co., Ltd., MFR at 190° C.: 1.1 g/10 min, density: 0.960 g/cm$^{3}$, referred to as "PE" in Table 1) in place of the polypropylene homopolymer. The results are shown in Table 1.

Reference Example 10 (for comparison)

Procedures were carried out in the same manner as in Reference example 1 except for not adding styrene. The results are shown in Table 1.

Reference Example 11 (for comparison)

Procedures were carried out in the same manner as in Reference example 1 except for not adding 2-hydroxyethyl methacrylate and changing the amount of styrene from 40 g to 100 g. The results are shown in Table 1.

tific Co., according to the following methods. The measurement results are shown in Table 2.

The saturated polyesters and the resin compositions were dried at 120° C. for 5 hours immediately before kneading and molding.

(1) Impact resistance

Test pieces having a length of 31.5 mm, a width of 6.2 mm and a thickness of 3.2 mm were prepared by injection molding. By using a Minimax Izod impact tester CS-138TI (trade name) manufactured by Custom Scientific Co., Izod impact strength without notch at 23° C. was measured.

TABLE 1

| | Composition (part by weight) | | | | | | Content (% by weight) | | | Hydroxyl group-remaining percentage (%) | MFR (g/10 min) |
|---|---|---|---|---|---|---|---|---|---|---|---|
| | | | Radical polymerization initiator | | | | HEMA residue | | Styrene residue | | |
| | PP | PE | Kind | Amount | HEMA[1] | Styrene | Reduced pressure | IR method | NMR method | IR method | | |
| Reference example 1 | 100 | — | B.P.B.[2] | 1 | 3 | 2 | Yes | 1.31 | 0.94 | 0.80 | 72 | 33.4 |
| Reference example 2 | 100 | — | B.P.B. | 1 | 3 | 5 | Yes | 1.28 | 1.08 | 1.98 | 84 | 1.3 |
| Reference example 3 | 100 | — | B.P.B. | 1 | 3 | 10 | Yes | 1.10 | 1.06 | 2.85 | 96 | 0.3 |
| Reference example 4 | 100 | — | B.P.B. | 1 | 5 | 5 | Yes | 1.91 | 1.18 | 1.38 | 62 | 5.1 |
| Reference example 5 | 100 | — | B.P.B. | 1 | 5 | 2 | Yes | 2.26 | 0.88 | 0.81 | 39 | 32.8 |
| Reference example 6 | 100 | — | B.P.I.B.[3] | 1 | 3 | 5 | Yes | 1.04 | 0.78 | 1.92 | 75 | 41.1 |
| Reference example 7 | 100 | — | B.P.I.B. | 1 | 5 | 5 | Yes | 1.73 | 1.20 | 1.62 | 69 | 32.8 |
| Reference example 8 | 100 | — | B.P.B. | 1 | 5 | 5 | No | 2.20 | 0.88 | 1.13 | 40 | 100< |
| Reference example 9 | — | 100 | B.P.B. | 1 | 5 | 5 | Yes | 2.08 | 1.20 | 1.42 | 58 | 0.7 |
| Reference example 10 | 100 | — | B.P.B. | 1 | 3 | 0 | Yes | 1.87 | 0.42 | — | 22 | 100< |
| Reference example 11 | 100 | — | B.P.B. | 1 | 0 | 5 | Yes | — | — | 2.50 | — | 0.23 |

HEMA[1]: 2-hydroxyethyl methacrylate, B.P.B.[2]: t-butyl peroxybenzoate, B.P.I.B.[3]: 1,3-bis(t-butyl peroxyisopropyl)benzene

Examples 1 to 12 and Comparative Examples 1 to 6

According to the composition ratios shown in Table 2, the modified polypropylene resins and the modified polyethylene resin obtained in Reference examples 1 to 11, an unmodified polypropylene resin Mitsubishi Polypropylene MA8 (trade name, produced by Mitsubishi Petrochemical Co., Ltd., MFR: 1.2 g/10 min, hereinafter referred to as "PP MA8"), an unmodified polyethylene resin Mitsubishi Polyethylene HY540 (trade name, produced by Mitsubishi Petrochemical Co., Ltd., high density polyethylene, hereinafter referred to as "PE HY540"), a saturated polyester Novadur 5010 (trade name, produced by Mitsubishi Kasei Corporation, polybutylene terephthalate, hereinafter referred to as "PBT 5010") and a saturated polyester PBK-1 (trade name, produced by Kanebo, Ltd., polyethylene terephthalate, hereinafter referred to as "PET PBK-1") were kneaded at 250° C. with a rotary number of 180 rpm for 5 minutes by using a Laboplastomill kneader (trade name) manufactured by Toyo Seiki Seisakusho Co., and the mixtures were pulverized to obtain granular resin compositions.

Characteristics of the resulting resin compositions were measured and evaluated by measuring test pieces obtained by injection molding at a temperature of 260° C. by using a CS183MMX Minimax injection molding machine (trade name) manufactured by Custom Scien- (2) Tensile strength Tensile test pieces having a parallel portion length of 7 mm and a parallel portion diameter of 1.5 mm were prepared by injection molding. By using a tensile tester CS-183TE (trade name) manufactured by Custom Scientific Co., a tensile test was conducted under a condition of a tensile rate of 1 cm/min to measure tensile yield stress and elongation at break.

(3) Appearance of molded product (laminar peeling)

A cellophane tape Jimpack No. 1 (trade name) produced by Nitto Denko Co. was sufficiently adhered to each surface of the test pieces molded in the above (1), and the surface was peeled off backward at a breath with a tape angle of about 30°. The area of the non-peeled portion was measured by the gravimetric analysis, and the area of the non-peeled portion was represented by percentage as a lamination-retaining rate according to the following equation (II):

Lamination-retaining rate (%) = (II)

(area of non-peeled portion) × 100/(area of test piece surface)

(4) Dispersed state

A part of the test piece molded in the above (1) was cut off and subjected to ion etching. Then, the dispersed particle size of the piece was observed by a scanning type electron microscope S-2400 (trade name) produced by Hitachi, Ltd.

(5) Content of saturated polyester-polyolefin type resin graft copolymer: 20 ml of trichlorobenzene was added to 1 g of the resin composition and the mixture was stirred at 180° C. for 30 minutes to dissolve and swell the resin composition. Then, 40 ml of xylene was added to the mixture, and the resulting mixture was cooled to a temperature of 130° C. while stirring to obtain a mixture of a solution in which the unreacted polyolefin type resin was dissolved and the unreacted saturated polyester and saturated polyester-polyolefin type resin graft copolymer which were insolubles. The mixture was centrifuged at 130° C. with 10,000 rpm for 30 minutes by using a centrifugal separator to collect a mixture of precipitates of the unreacted saturated polyester and saturated polyester-polyolefin type resin graft copolymer. The mixture was filtered, washed and then dried under reduced pressure.

The supernatant was poured into 150 ml of methanol to precipitate the unreacted polyolefin type resin. The precipitates were filtered, washed and then dried under reduced pressure to isolate the unreacted polyolefin type resin. The weight ($W_A$) of this component was measured.

Then, 30 ml of hexafluoroisopropanol was added to the mixture of the unreacted saturated polyester and saturated polyester-polyolefin type resin graft copolymer. The mixture was stirred at room temperature for 5 hours to dissolve the unreacted saturated polyester. The insolubles of the solution was filtered under reduced pressure by using a filter of 0.45 μm and then dried under reduced pressure to isolate the saturated polyester-polyolefin type resin graft copolymer. The weight ($W_g$) of this component was measured.

The filtrate was poured into 150 ml of methanol to precipitate the unreacted saturated polyester. The precipitates were filtered, washed and then dried under reduced pressure to isolate the unreacted saturated polyester. The weight ($W_B$) of this component was measured.

As a result of analyzing the respective components isolated by the above means according to the infrared spectroscopic analysis, it was confirmed that each component comprised the polyolefin type resin, the saturated polyester-polyolefin type graft copolymer or the saturated polyester alone.

From the weights of the respective isolated components, the content ($C_g$) of the saturated polyester-polyolefin type resin graft copolymer was determined according to the following equation (III):

$$C_g(\%) = 100 W_g/(W_A + W_g + W_B) \quad \text{(III)}$$

The results are shown in Table 2.

Example 13

1,000 g of homopolymer powder of polypropylene (MFR at 230° C.: 1 g/10 rain, melting point: about 164° C., hereinafter referred to as "PP TA8"), 50 g of 2-hydroxyethyl methacrylate (hereinafter referred to as "HEMA"), 50 g of styrene, 10 g of his (t-butyl peroxyisopropyl)benzene (hereinafter referred to as "BPIB"), 40 g of MARK PEP36 (trade name, produced by Adeca Argas Co.) as a stabilizer 20 g of IRGANOX 1010 (trade name, produced by Ciba Geigy AG) and 20 g of talc PKP#80 (trade name, produced by Fuji Talc Kogyo Co.) as an inorganic filler were mixed by a super mixer. Then, 1,300 g of PBT 5010 and 1,300 g of PET PBK-1 were added to the mixture, and the resulting mixture was stirred by a super mixer. The mixture was kneaded by using a TEX 30 Type biaxial extruder (trade name) manufactured by Nippon Seikosho Co. under conditions of a cylinder temperature of 280° C., a screw rotary number of 200 rpm and a discharging amount of 15 kg/hr to obtain a desired resin composition. Characteristics of the resulting resin composition were evaluated in the same manner as in Example 1, and the results are shown in Table 2.

Example 14

1,000 g of PP TA8 and 10 g of BPIB were mixed by a super mixer. The mixture was charged into a TEX 30 Type biaxial extruder (trade name) manufactured by Nippon Seikosho Co. which could feed a starting material midway at 2 positions, from a hopper thereof and melted. Then, a mixed solution of 50 g of HEMA and 50 g of styrene was added to the mixture according to the liquid addition method from a former vent port at which a cylinder temperature was set at 180° C. Thereafter, 1,300 g of PBT 5010, 1,300 g of PET PBK-1, 40 g of MARK PEP36 (trade name, produced by Adeca Argas Co.) as a stabilizer, 20 g of IRGANOX 1010 (trade name, produced by Ciba Geigy AG) and 20 g of talc PKP#80 (trade name, produced by Fuji Talc Kogyo Co.) as an inorganic filler were added to the mixture from a latter vent port at which a cylinder temperature was set at 280° C., and the mixture was continuously kneaded under conditions of a screw rotary number of 200 rpm and a discharging amount of 15 kg/hr to obtain a desired resin composition. Characteristics of the resulting resin composition were evaluated in the same manner as in Example 1, and the results are shown in Table 2.

TABLE 2

| Composition (% by weight) | Example 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Reference example 1 | 30 | — | — | — | — | — | — | — | — | — | — | — | — | — |
| Reference example 3 | — | 30 | — | — | — | 30 | 30 | 50 | — | — | — | — | — | — |
| Reference example 4 | — | — | 30 | — | — | — | — | — | 70 | 15 | 25 | — | — | — |
| Reference example 5 | — | — | — | 30 | — | — | — | — | — | — | — | — | — | — |
| Reference example 8 | — | — | — | — | — | — | — | — | — | — | — | 15 | — | — |
| Reference example 9 | — | — | — | — | 30 | — | — | — | — | — | — | — | — | — |
| Reference example 10 | — | — | — | — | — | — | — | — | — | — | — | — | — | — |
| Reference example 11 | — | — | — | — | — | — | — | — | — | — | — | — | — | — |
| PP MA8 | — | — | — | — | — | — | — | — | — | 15 | 25 | 15 | — | — |
| PE HY540 | — | — | — | — | — | — | — | — | — | — | — | — | — | — |
| PP TA8 | — | — | — | — | — | — | — | — | — | — | — | — | 27 | 27 |
| HEMA | — | — | — | — | — | — | — | — | — | — | — | — | 1.35 | 1.35 |
| Styrene | — | — | — | — | — | — | — | — | — | — | — | — | 1.35 | 1.35 |
| B.P.I.B | — | — | — | — | — | — | — | — | — | — | — | — | 0.30 | 0.30 |

TABLE 2-continued

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PBT 5010 | 35 | 35 | 35 | 35 | 35 | 70 | — | 50 | 30 | 35 | 25 | 35 | 35 | 35 |
| PET PBK-L | 35 | 35 | 35 | as | 35 | — | 70 | — | — | 35 | 25 | 35 | 35 | 35 |
| Evaluation results | | | | | | | | | | | | | | |
| Izod impact strength (without notch) (kgf · cm/cm$^2$) | 20.3 | 34.3 | 28.5 | 17.5 | 37.2 | 54.6 | 30.4 | 26.6 | 50.5 | 34.1 | 31.6 | 35.2 | 24.5 | 32.3 |
| Tensile Yield stress (kg/cm$^2$) | 600 | 580 | 560 | 570 | 550 | 550 | 620 | 490 | 430 | 550 | 480 | 450 | 520 | 580 |
| Tensile elongation (%) | 27 | 46 | 72 | 25 | 35 | 100 | 56 | 70 | 170 | 30 | 32 | 40 | 80 | 70 |
| Lamination-retaining rate (%) | 100 | 100 | 100 | 92 | 100 | 100 | 100 | 100 | 100 | 100 | 100 | 96 | 100 | 100 |
| Dispersed particle size (μm) | 0.9 | 0.6 | 0.8 | 1.2 | 0.8 | 0.5 | 0.9 | 2.5 | 0.4 | 0.8 | 3.0 | 0.8 | 1.1 | 0.8 |
| Cg of graft copolymer (% by weight) | 8.2 | 17.7 | 16.2 | 6.8 | — | — | — | 20.1 | 21.5 | — | — | — | — | — |

| Composition (% by weight) | Comparative example 1 | 2 | 3 | 4 | 5 | 6 |
|---|---|---|---|---|---|---|
| Reference example 1 | — | — | — | — | — | — |
| Reference example 3 | — | — | — | — | — | — |
| Reference example 4 | — | — | — | — | — | — |
| Reference example 5 | — | — | — | — | — | — |
| Reference example 8 | — | — | — | — | — | — |
| Reference example 9 | — | — | — | — | — | — |
| Reference example 10 | 30 | — | — | — | — | — |
| Reference example 11 | — | 30 | — | — | — | — |
| PP MA8 | — | — | 30 | 50 | 70 | — |
| PE HY540 | — | — | — | — | — | 30 |
| PP TA8 | — | — | — | — | — | — |
| HEMA | — | — | — | — | — | — |
| Styrene | — | — | — | — | — | — |
| B.P.I.B | — | — | — | — | — | — |
| PBT 5010 | 35 | 35 | 35 | 50 | 30 | 35 |
| PET PBK-L | 35 | 35 | 35 | — | — | 35 |
| Evaluation results | | | | | | |
| Izod impact strength (without notch) (kgf · cm/cm$^2$) | 15.2 | 8.2 | 8.0 | 14.8 | 23.0 | 9.0 |
| Tensile Yield stress (kg/cm$^2$) | 510 | 440 | 440 | 430 | 410 | 460 |
| Tensile elongation (%) | 18 | 15 | 14 | 20 | 44 | 17 |
| Lamination-retaining rate (%) | 60 | 12 | 10 | 0 | 20 | 18 |
| Dispersed particle size (μm) | 2.5 | 5–10 | 5–10 | 20–56 | 5–10 | 5–10 |
| Cg of graft copolymer (% by weight) | 1.7 | 0 | 0 | 0 | 0 | 0 |

As can be clearly seen from the results of the evaluation tests of Examples 1 to 14 and Comparative examples 1 to 6, as compared with the composition comprising the polyolefin type resin modified with either the α,β-unsaturated carboxylate having a hydroxyl group or the aromatic vinyl compound, and the saturated polyester, the composition comprising the modified polyolefin type resin obtained by graft polymerization with the α,β-unsaturated carboxylate having a hydroxyl group(s) and the aromatic vinyl compound, and the saturated polyester has extremely improved compatibility of the polyolefin type resin and the saturated polyester. As can be clearly seen from Tables 1 and 2, in the modified polyolefin type resin with significantly improved compatibility used in the resin composition, the α,β-unsaturated carboxylate having a hydroxyl group(s) has a high hydroxyl group-remaining percentage of 30 to 100%. Thus, it can be considered that the compatibility of the resin composition containing the modified polyolefin type resin and the saturated polyester is improved. In the resin composition thus obtained, moldability is good, appearance of a molded product is good and a balance of mechanical characteristics such as impact resistance and tensile strength is excellent. Thus, the composition of the present invention can be used for various purposes, and it can be an industrially useful material.

We claim:

1. A thermoplastic resin composition which comprises (A) 90 to 10% by weight of a modified polyolefin resin obtained by subjecting 100 parts by weight of a polyolefin resin to graft polymerization with 0.01 to 20 parts by weight of an α,β-unsaturated carboxylate having a hydroxyl group(s) and 0.01 to 50 parts by weight of an aromatic vinyl compound;

(B) 10 to 90% by weight of a saturated polyester; and
wherein the modified polyolefin resin (A) has a hydroxyl group remaining percentage of 30 to 100%.

2. The composition according to claim 1, wherein said composition comprises (A) 70 to 30% by weight of the modified polyolefin resin; and (B) 30 to 70% by weight of the saturated polyester.

3. The composition according to claim 1, wherein the α,β-unsaturated carboxylate having a hydroxyl group(s) is at least one selected from the group consisting of 2-hydroxyethyl methacrylate, 2-hydroxyethyl acrylate, 2-hydroxypropyl acrylate, 2-hydroxypropyl methacrylate and a methacrylate or acrylate of an oligomer of ethylene glycol or propylene glycol having 4 to 40 carbon atoms.

4. The composition according to claim 1, wherein the α,β-unsaturated carboxylate having a hydroxyl group(s) is 2-hydroxyethyl methacrylate.

5. The composition according to claim 1, wherein the aromatic vinyl compound is at least one selected from the group consisting of styrene, α-methylstyrene, t-butylstyrene, α-methylvinyltoluene, methylstyrene, dimethylstyrene, chlorostyrene, dichlorostyrene, bromostyrene, dibromostyrene and vinylnaphthalene.

6. The composition according to claim 1, wherein the aromatic vinyl compound is styrene, α-methylstyrene or methylstyrene.

7. The composition according to claim 1, wherein the polyolefin resin is a polymer comprising at least one α-olefin having 2 to 12 carbon atoms and having a crystallinity at room temperature measured by X-ray diffraction of 10% or more.

8. The composition according to claim 7, wherein the α-olefin is at least one selected from the group consisting of ethylene, propylene, butene-1, pentene-1, hexene-1, 3-methylbutene-1, 3-methylpentene-1, 4-methylpentene-1 and 3-methylhexene-1.

9. The composition according to claim 1, wherein the α,β-unsaturated carboxylate having a hydroxyl group(s) is 2-hydroxyethyl methacrylate and the aromatic vinyl compound is styrene or α-methylstyrene.

10. The composition according to claim 1, wherein 0.05 to 10 parts by weight of the α,β-unsaturated carboxylate having a hydroxyl group(s) and 0.05 to 20 parts by weight of the aromatic vinyl compound are introduced into the polyolefin resin based on 100 parts by weight of the polyolefin resin.

11. The composition according to claim 1, wherein the saturated polyester (B) is at least one selected from the group consisting of polyethylene terephthalate, polybutylene terephthalate, polyethylene naphthalate and poly(1,4-cyclohexanedimethylene terephthalate).

12. The composition according to claim 1, wherein the modified polyolefin resin (A) has a hydroxyl group-remaining percentage of 40 to 100%.

* * * * *